United States Patent [19]
Narayanaswamy

[11] Patent Number: 6,167,411
[45] Date of Patent: Dec. 26, 2000

[54] USER INTERFACE FOR ENTERING AND EDITING DATA IN DATA ENTRY FIELDS

[75] Inventor: Shankar Narayanaswamy, Sunnyvale, Calif.

[73] Assignee: Lucent Technologies Inc., Murray Hill, N.J.

[21] Appl. No.: 09/102,195

[22] Filed: Jun. 22, 1998

[51] Int. Cl.[7] .............................. G06K 9/00; G06F 17/21
[52] U.S. Cl. ........................................... 707/541; 382/189
[58] Field of Search ..................... 382/186, 187, 382/188, 189; 707/507, 505, 506, 541, 526

[56] References Cited

U.S. PATENT DOCUMENTS

| | | | |
|---|---|---|---|
| 4,860,372 | 8/1989 | Kuzunuki et al. | 382/13 |
| 5,257,074 | 10/1993 | Kamei | 355/244 |
| 5,276,794 | 1/1994 | Lamb, Jr. | 395/149 |
| 5,297,216 | 3/1994 | Sklarew | 382/13 |
| 5,305,394 | 4/1994 | Tanaka | 382/13 |
| 5,389,745 | 2/1995 | Sakamoto | 178/18 |
| 5,455,901 | 10/1995 | Friend et al. | 395/149 |
| 5,509,087 | 4/1996 | Nagamine | 382/188 |
| 5,555,317 | 9/1996 | Anderson | 382/159 |
| 5,555,325 | 9/1996 | Burger | 382/309 |
| 5,682,538 | 10/1997 | Lemire et al. | 395/768 |
| 5,704,029 | 12/1997 | Wright, Jr. | 395/149 |
| 5,732,152 | 3/1998 | Sakai et al. | 382/189 |
| 5,749,082 | 5/1998 | Sasaki | 707/508 |
| 5,940,535 | 8/1999 | Huang | 382/201 |
| 5,991,441 | 11/1999 | Jourjine | 382/187 |
| 6,002,390 | 12/1999 | Masui | 345/173 |
| 6,005,973 | 12/1999 | Seybold et al. | 382/187 |
| 6,009,199 | 12/1999 | Ho | 382/224 |
| 6,011,554 | 1/2000 | King et al. | 345/352 |
| 6,011,865 | 1/2000 | Fujisaki et al. | 382/189 |
| 6,014,460 | 1/2000 | Fukushima et al. | 382/177 |
| 6,018,591 | 1/2000 | Hull et al. | 382/186 |
| 6,021,218 | 2/2000 | Capps et al. | 382/187 |
| 6,023,529 | 2/2000 | Ilan et al. | 382/186 |
| 6,023,669 | 2/2000 | Suda et al. | 704/2 |
| 6,026,177 | 2/2000 | Mong et al. | 382/156 |

*Primary Examiner*—Joseph H. Feild
*Attorney, Agent, or Firm*—Darby & Darby

[57] ABSTRACT

An automatically advancing user interface for entering new data and editing pre-existing data in data entry fields on a display screen. Data is entered and/or edited in a universal handwriting capture widget. A plurality of text entry widgets corresponding to the different data entry fields are displayed on the screen. The user defines a sequentially ordered list of text entry widgets. At any given time only one text entry widget is selected as the current text entry widget based on the sequentially ordered list. The data in the current text entry widget is displayed in the handwriting capture widget. After the data has been entered and/or edited in the handwriting capture widget it is displayed in the current text entry widget. The current text entry widget is then automatically advanced by selecting as the current text entry widget the next text entry widget in the sequentially ordered list of text entry widgets.

30 Claims, 6 Drawing Sheets

FIG. 2

| Inferno | | | | | – □ × |
|---|---|---|---|---|---|
| Last Name | First Name | Office | Fax | Home | |
| Smith | Adam | 212-555-7119 | 212-555-0779 | 212-555-5052 c_R | |
| Earhart | Amelia | 630-555-9124 | 630-555-7074 | 630-555-1011 c_R | |
| Keynes | Milton | 630-555-0121 | 630-555-7074 | 630-555-3957 c_R | |
| Adams | Last Name | | | 5-5704 | 415-555-6410 c_R |
| Clarke | First Name | | | 5-7847 | 326-555-5815 c_R |
| Housto | Office Phone | | | 5-7777 | 732-555-6338 c_R |
| Matthe | Fax | | | 5-7074 | 908-555-5574 c_R |
| Carneg | Home Phone | | | 5-7074 | 708-555-0913 c_R |
| | Cancel —95 | | OK —90 | | |

| EXIT | Save | Delete | New | Edit | Search | Sort | Up | Down |
|---|---|---|---|---|---|---|---|---|
| Start | | | | | | | ← | Clear |
| | | | | | | | | Lower |
| | | | | | | | → | Done |

USER INTERFACE FOR ENTERING AND EDITING DATA IN DATA ENTRY FIELDS

FIELD OF THE INVENTION

The present invention relates to an automatically advancing user interface for entering new data and editing pre-existing data in data entry fields of a software application on a display screen.

Portable devices, such as Personal Digital Assistants (PDAs), are widely used. Typically, PDAs include a variety of software applications such as e-mail, web browsing, facsimile transmissions, a calendar, a calculator, an appointment book, and/or an address directory. Development in portable devices continues to strive towards realizing user interfaces which are user-friendly and suitable for a wide variety of software applications. An efficient, user-friendly interface is vital for user acceptance of any consumer product. For a portable device such as a PDA one criterion by which the user interface is evaluated is the ease with which data may be entered into the applications themselves.

Software applications typically include a display screen divided into a plurality of data entry fields with buttons and/or menus. Using an address directory software application as an example, the directory itself consists of numerous address entries each of which includes data entry fields such as first name, last name, home telephone number and office telephone number. In a typical point-and-touch user interface a particular data entry field is selected to receive text by tapping a pen in a data entry area of the screen corresponding to the particular data field. A separate data entry area on the screen is provided for each data entry field and data is entered or edited in the respective data entry areas. The user selects a particular data entry field by tapping in the corresponding data entry area and then enters the data in the same area using the pen. A similar procedure is followed to correct or update the information in a particular data entry field wherein the user taps in the corresponding data entry area and corrects or updates the data within that particular field. Since the conventional user interface requires the point-and-touch device to be positioned within each separate data entry area the user's arm is continuously being repositioned, which significantly reduces the speed at which the user may enter the data into the respective data entry fields.

The "PALMPILOT" PDA manufactured by 3Com employs a user interface that reduces the extent of arm movement associated with entering and editing data in a plurality of data entry fields. The "PALMPILOT" uses special predefined unistroke characters from the "GRAFFITI" character set which are processed by a "GRAFFITI" recognition engine. The shapes of the unistrokes are defined to be as differentiable as possible while having some similarity to the character they represent. A unistroke is hand printed in a predefined handwriting area positioned along the bottom of the display screen. Specifically, the predefined handwriting area is subdivided into a left-hand alphabet portion in which a letter may be written and a right-hand numerical portion in which a number may be written. Depending on whether the character being written is a letter/number it will be written in the appropriate portion of the handwriting area. Each portion of the predefined handwriting area is sized to accommodate only a single unistroke so that each successive letter/number unistroke is written on top of the previously written letter/number unistroke. No means are provided for visualizing the character which is being written until the recognized character from the recognition device is displayed in the current data entry field.

The "PALMPILOT" user interface is disadvantageous for several reasons. The special unistroke characters must first be learned by the user. Furthermore, the user must continuously shift visual focus between the predefined data entry area to view the current unistroke being written and the current text entry area in which the recognized characters are being displayed to view previously written unistrokes. This is both inefficient and a strain on the user's eyes. Furthermore, although the "PALMPILOT" reduces the amount of arm movement required to enter and edit the data in the data entry fields a significant amount of arm movement is still necessary since each text entry field in which the data is to be entered or edited must first be selected by positioning and tapping the pen in the desired text entry area.

It is therefore desirable to overcome the shortcomings and disadvantages associated with conventional user interface devices.

SUMMARY OF THE INVENTION

For the purposes of the present disclosure a "character" is defined as a symbol, letter, number, punctuation symbol, graphical symbol and/or empty space. "Text" or "data" is one or more characters. A "widget" is defined as a graphical area that appears on the display screen such as a window, menu and/or button. In addition, the term "handwritten" when referring to a character is the actual strokes of the character which is drawn or entered by the user in the handwriting capture widget using the data input device. "Recognized" when referring to a character denotes that the character is generated by some means other than being handwritten by the user, e.g. machine generated such as by a computer, although such generation may be in response to an action taken by a user, such as supplying handwriting information.

The present invention is directed to a method and apparatus for entering new characters and editing pre-existing characters in a plurality of data entry fields on a display screen including a fixed handwriting capture widget and a plurality of text entry widgets corresponding to the data entry fields using a user interface. One text entry widget from a sequentially ordered list of text entry widgets is assigned as a current text entry widget and any characters in the current text entry widget are displayed in the handwriting capture widget The handwriting capture widget receives at least one character for entry into the current text entry widget. After receipt of the at least one character in the current text entry widget is complete and when the current text entry widget is not a last text entry widget in the sequentially ordered list of text entry widgets, a next text entry widget from the sequentially ordered list of text entry widgets is automatically selected as the current text entry widget, and the displaying, receiving, and selecting steps are repeated for the current text entry widget.

In one embodiment, the invention is directed to a method and apparatus for entering new characters in the data fields on a display screen using an automatically advancing user interface. Initially, a blank text entry widget for each data entry field is displayed on the display screen. Then a first text entry widget from a sequentially ordered list of text entry widgets is automatically selected as a current text entry widget. The new character to be entered in the current text entry widget is written in a handwriting capture widget using a data input device. Each new character is captured and visually represented in the handwriting capture widget as it is being written by following the new character trajectory of the data input device. A determination is then made whether a complete new character of the data has been provided to the handwriting capture widget. Writing of a new character continues if it is not yet completed; otherwise, the completed new character in the handwriting capture widget is transmitted to a handwriting recognition device.

The handwriting recognition device detects recognized characters and replaces the visual representation of the completed new character in the handwriting capture widget with the recognized new character. After all of the new characters for a given data entry field have been written in the handwriting capture widget the recognized new characters are displayed in the current text entry widget. Then a determination is made if the current text entry widget is the last text entry widget in the sequentially ordered list of text entry widgets. If it is, then all of the new characters have been entered in the respective text entry widgets and processing is terminated. If, however, the current text entry widget is not the last text entry widget in the sequentially ordered list of text entry widgets, then a next text entry widget in the ordered list of text entry widgets is selected as the current text entry widget, the handwriting capture widget is cleared, and the process is repeated for the new current text entry widget.

Another embodiment of the invention provides a correction menu for editing new characters currently entered in the handwriting capture widget. The correction menu may be displayed automatically when the handwriting recognition device does not recognize the new character written in electronic ink in the handwriting capture widget. Alternatively, the user may initiate display of the correction menu such as by tapping on a misrecognized character in the handwriting capture widget. Preferably, the corrections menu includes a variety of options from which the user must choose such as selecting a character from a list of a predetermined number of most recognized characters identified by the handwriting recognition device, rewriting the character using the data input device, or entering the character using a software keyboard.

Yet another embodiment of the invention performs editing of pre-existing characters in data entry fields on the display screen using the automatically advancing user interface. Initially, a current data entry on the display screen is selected and pre-existing characters from the data entry fields corresponding to the selected current data entry is displayed in text entry widgets. A first text entry widget from a predefined sequentially ordered list of text entry widgets is selected as a current text entry widget and the pre-existing characters from the current text entry widget is displayed in the handwriting capture widget. Then, a character to be edited in the handwriting capture widget is selected and edited. The edited character is displayed in the current text entry widget and handwriting capture widget. A determination is then made if the current text entry widget is the last text entry widget in the sequentially ordered list of text entry widgets, and if it is then the processing is terminated. Otherwise, if the current text entry widget is not the last text entry widget in the sequentially ordered list of text entry widgets then a next text entry widget in the sequentially ordered list of text entry widgets is selected as the current text entry widget and the processing is repeated for the new current text entry widget.

BRIEF DESCRIPTION OF THE DRAWINGS

In the drawings, wherein like reference numerals delineate similar elements throughout the several views:

FIG. 2 is an example of the display screen of the user interface of FIG. 1 during entry of new data in the data entry fields;

DETAILED DESCRIPTION

Figure 1:
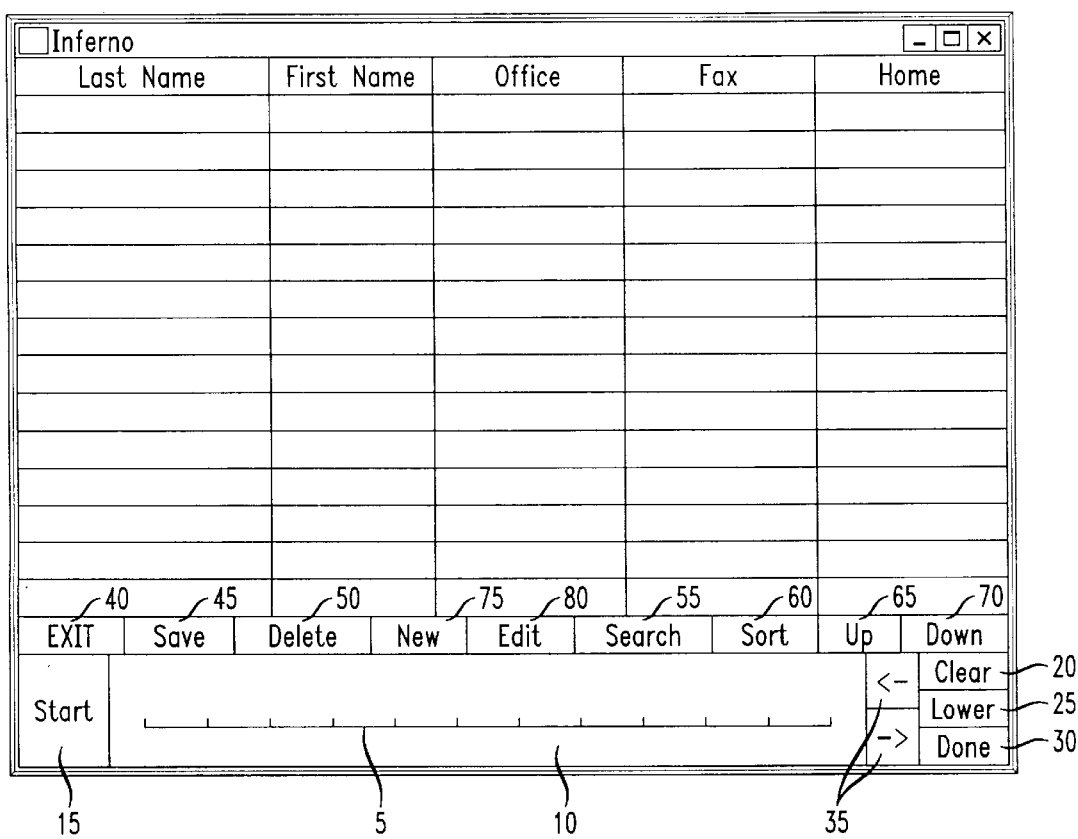
FIG. 1 is an example of a display screen of a user interface in accordance with the present invention, showing an address directory software application prior to entering new data or editing of pre-existing data.

By way of illustrative example, the present inventive, automatically advancing user interface is shown and described using an address directory software application. It is noted, however, that the invention is intended for any type of software application. FIG. 1 is an example of a display screen of the user interface in accordance with the present invention for an address directory software application prior to entering new data or editing of pre-existing data. Each address entry comprises five data entry fields identified as "Last Name", "First Name", "Office", "Fax" and "Home", respectively. In FIG. 1 all characters are entered in a Handwriting Capture Widget (HCW) 10. The HCW is preferably disposed along the lower portion of the display screen to provide maximum screen visibility with negligible, if any, obstruction even during data entry or editing. Although it is preferred to position the HCW along the lower portion of the screen, it may be moved to any desirable position on the screen. The HCW 10 preferably includes a substantially horizontal baseline 5 along which the user handwrites or enters text comprising one or more characters using an input device such as a pen, stylus, puck, or software keyboard. In a preferred embodiment the baseline is separated by tick marks so that a single character is placed between adjacent tick marks. If a stylus or pen is used as the input device then the user simply handwrites each character, one after the other, along the baseline between the tick marks. Preferably, the handwritten characters entered in the HCW are printed rather than cursive or mixed-mode because the input characters may include mainly non-dictionary words such as Universal Resource Locators (URLs) for the Web, e-mail addresses, telephone numbers, and personal names and places. In an alternative embodiment, the characters may be selected using a software keyboard thereby eliminating the need for handwriting recognition analysis. The use of a software keyboard, however, is not preferable since in a portable device the keyboard is relatively small and, thus, requires a pointing device such as a pen or finger to individually select each character which significantly reduces the rate at which data may be entered. Scrolling of relatively long data entries in the HCW from right to left may be provided via arrow buttons 35 or by some other known scrolling method. The number of characters by which the HCW advances each time button 35 is pressed may be preset as desired.

As shown in FIG. 1 a plurality of buttons are displayed adjacent to the HCW 10 corresponding to different features and/or functions. The buttons shown are for illustrative purposes only and the number of buttons, the labels used to identify each button, and the arrangement thereof may be varied as desired. To the left of the HCW a "Start" button 15 is provided which toggles through one or more software applications each time it is selected. On the right hand side of the HCW are "Clear", "Lower", and "Done" buttons 20, 25 and 30, respectively. The "Clear" button 20 deletes selected characters and by default clears all characters in the HCW if no character is selected. Button 25 is shown in FIG. 1 with a "Lower" state active, however, button 25 toggles between one of three states, "Lower", "Upper" and "Digit". Depending on which state is active, "Lower", "Upper" or "Digit", the only acceptable characters to be entered in the HCW will be lower case letters, upper case letters, or numbers, respectively. Preferably, by default punctuation symbols are acceptable in all three categories. In an alternative embodiment, a fourth "Symbol" state may be added to toggle button 25. The "Done" button 30 is selected to indicate when entry of the input data in the HCW is completed.

Additional functions are indicated by respective preferably arranged proximate the HCW. For the most part, the functions are self explanatory. In short, the "Exit" button 40 when selected exits all software applications; the "Save" button 45 is selected to save newly added or edited data; the "Delete" button 50 is used to delete a selected data entry; the "Search" button 55 allows the user to search for a particular data entry; the "Sort" button 60 will sort the data entries based on some selected order, and the "Up" and "Down" buttons 65, 70 are used to scroll the data entries. These functions are well known and thus, need not be described in detail. The remaining "New" and "Edit" buttons 75, 80 are used to enter a new address and edit a previously existing address in the address directory, respectively, and will be described in detail below.

As each character is handwritten it is captured and initially displayed in the HCW, as for example using electronic ink, so that the user may visually observe the characters as they are being written and in the same designated area in which they are written. After each character is written it is transmitted to a handwriting recognition device. Then the recognized characters from the handwriting recognition device automatically replace the electronic ink characters in the HCW. Completion of writing of a single character may be identified by the passage of a predetermined period of time after picking up the pen before placing it back in the HCW or by placement of the pen at another position in the HCW.

The data entered in the HCW is placed into respective data entry fields on the display screen using Text Entry Widgets (TEWs). Each data entry field of the screen is a separate TEW. Since there are five data fields in the example shown in FIG. 1 there are five corresponding TEWs. In a preferred embodiment the TEWs for a selected address entry are overlaid over the background window. The TEWs and HCW are electronically connected so as to communicate with one another. At any given time, only one TEW is selected or active and is referred to as the "current" TEW. The current TEW is highlighted so as to be readily recognizable. Alternatively, the particular character being edited in the current TEW may be highlighted.

The creator or developer of the particular software application will assign each TEW in the form an ordered number so as to organize the TEWs into a predefined sequentially ordered list. At any time, however, the user may override the ordered list of TEWs by tapping on a particular TEW on the screen with a touch-and-point device whereby the selected TEW becomes the current TEW and the ordered list is thereafter followed. Upon completion of entry of all characters in the data entry field the recognized characters from the handwriting recognition device are inserted at the appropriate position in the current TEW which, in turn, gives up its position as the current TEW and is replaced by the next TEW in the sequentially ordered list of TEWs.

Figure 3:
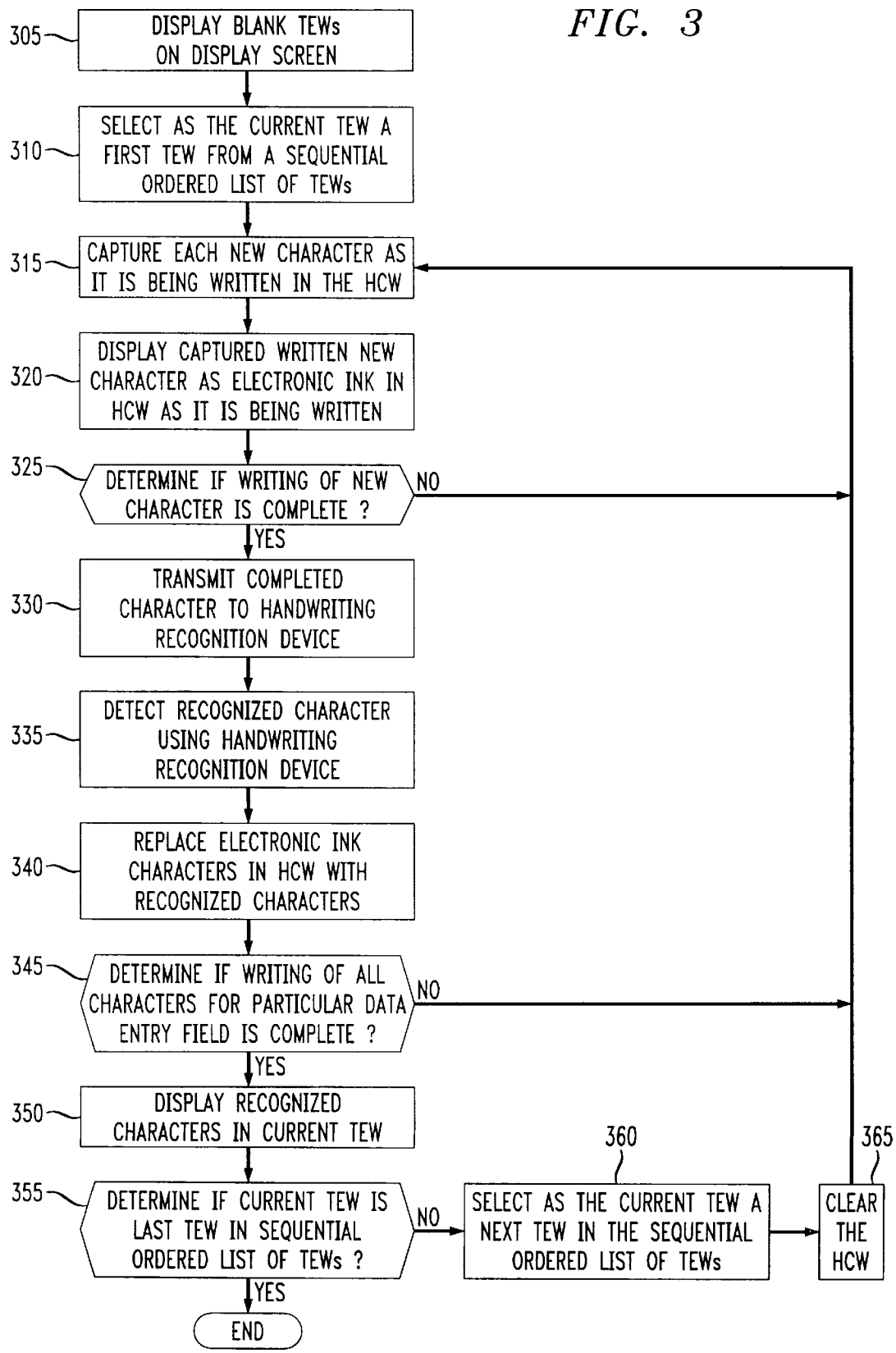
FIG. 3 is a flow chart of a method for entering new data in the data entry fields using a user interface in accordance with the present invention.

New address entries may be added to the address directory by selecting "New" button 75. A view of the display screen after "New" button has been selected is shown in FIG. 2. FIG. 3 shows a flow chart of the inventive method for entering new data using the user interface. Initially, in step 305 a corresponding group of five blank TEWs appears on the display screen overlapping the background window as shown in FIG. 2. Then in step 310 a first TEW from a predefined sequentially ordered list of TEWs is selected as the current TEW. As each character is being written it is captured and initially displayed as electronic ink in the HCW in steps 315 and 320. A determination is made in step 325 whether writing of the character is complete. If writing is not complete, the process returns to step 315. Otherwise, if writing of the character is complete then in steps 330–340 the electronic ink of the completed character is transmitted to the handwriting recognition device which detects recognized characters and then the electronic ink characters in the HCW are replaced by the recognized characters. Completion of writing of a single character may be identified by the passage of a predetermined period of time after picking up the data input device before placing it back in the HCW or by placement of the data input device at another position in the HCW. Thereafter, in steps 345 and 350 when the user identifies the completion of writing of all characters for a particular data field such as by tapping on the "Done" button the recognized characters from the handwriting recognition device are displayed in the appropriate positions of the current TEW. Alternative means for signifying the completion of data entry for a particular field may be used. A determination is made in step 355 if the current TEW is the last TEW in the sequentially ordered list of TEWs. If the current TEW is the last TEW in the sequentially ordered list of TEWs then processing is terminated; otherwise, in steps 360 and 365 the next TEW in the sequentially ordered list of TEWs is selected as the current TEW, the HCW is cleared, and operation returns to step 315, where character capture for the next data entry field (current TEW) begins. In a preferred embodiment, an additional button, for example, "OK" button 90, is provided which overrides advancement and editing of the remaining TEWs in the sequentially ordered list of TEWs. This additional feature is advantageous, for example, when the last name in the address directory is to be edited but no other TEWs. Assuming that the sequentially ordered list of TEWs is as written from left to right, that is, last name, first name, office telephone number, fax number, home telephone number, after the first TEW (last name) has been edited then the user may select the "OK" button 90 to skip having to advance through the remaining TEWs in the predefined sequentially ordered list which do not require editing.

Figure 4:
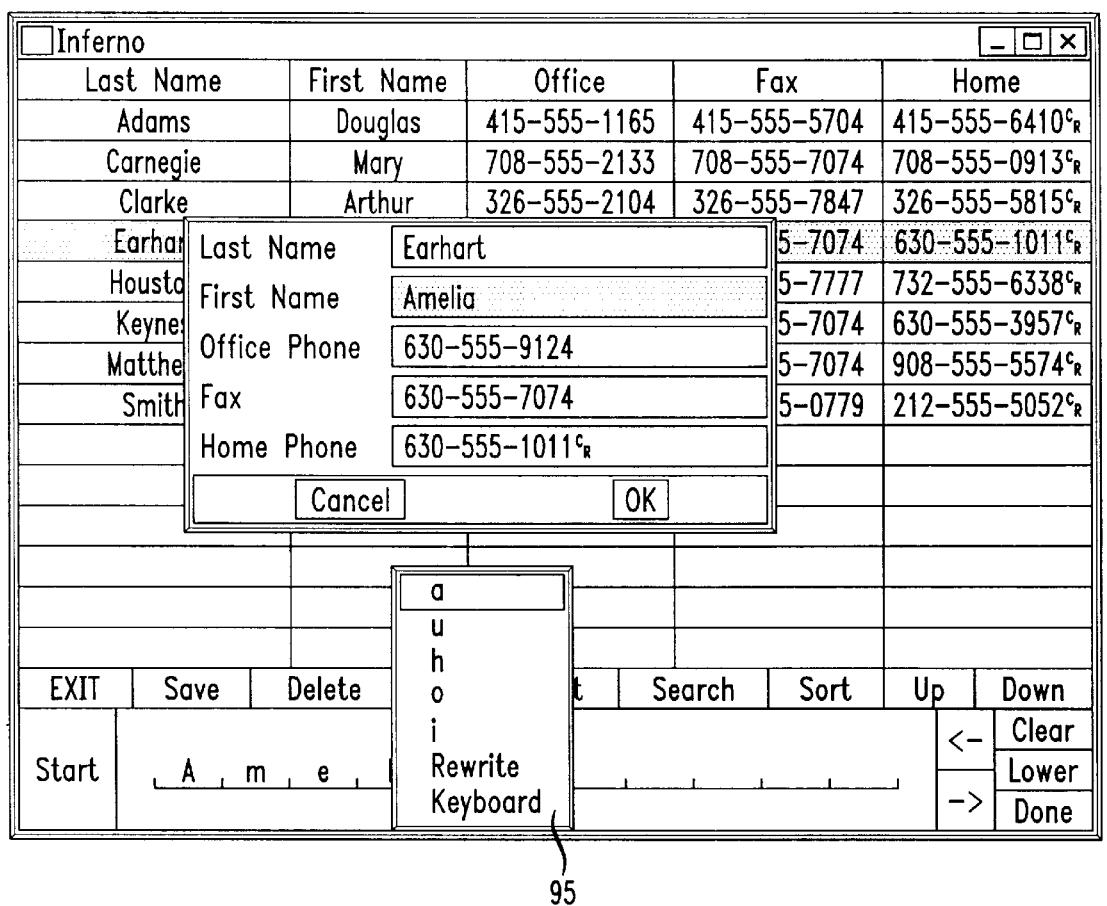
FIG. 4 is an example of the display screen of the user interface of FIG. 1 during editing of current data in the handwriting capture widget using a corrections menu.

In a preferred embodiment during current data entry in the HCW if the recognizer does not recognize a character from the electronic ink, then a correction menu is automatically displayed in an overlaid window identifying the available editing options. Alternatively, display of the correction menu may be user initiated such as by tapping on a misrecognized character in the handwriting capture widget. Three editing options are preferably provided including selection of a character from a list of a predetermined number of most probable alternative characters recognized by the handwriting recognizer, rewriting the character by selecting the "rewrite" option, or entering the character using a soft keyboard by selecting the "keyboard" option. By way of example, FIG. 4 shows the corrections menu 95 with the five most probable alternative characters identified by the handwriting recognition device, however, any number of closest recognized characters may be listed. It is evident that depending on the selected function in the correction menu different processing steps will be performed. If one of the alternative recognized characters is selected then the selected recognized character will be displayed in the HCW. Likewise, if the "keyboard" option is chosen in the corrections menu then a software keyboard is displayed, and a character is selected from the keyboard and displayed in the HCW. Should the user select to "rewrite" the character then the handwritten character in the HCW will be captured and identified using electronic ink as it is being written and recognition processing steps will be performed similar to those performed during entry of new data.

Figure 5:
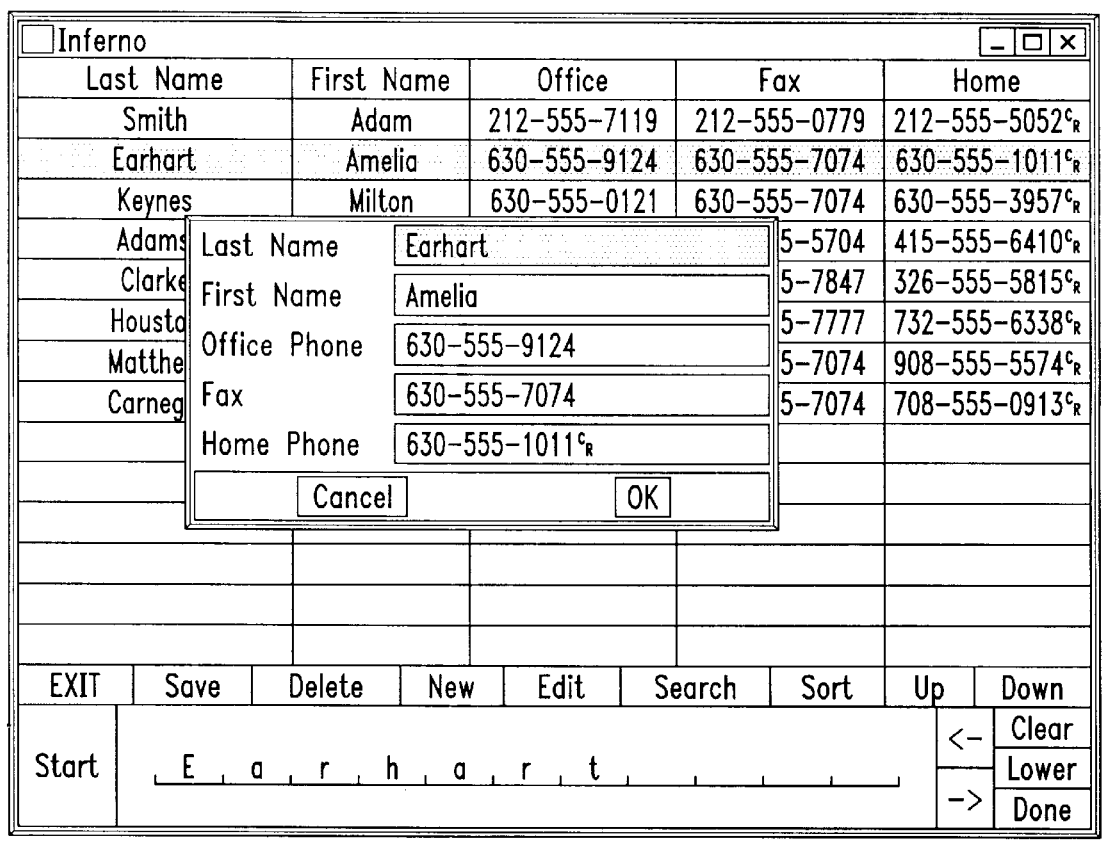
FIG. 5 is an example of the display screen of the user interface of FIG. 1 during editing of pre-existing data from a selected data entry field.
Figure 6:
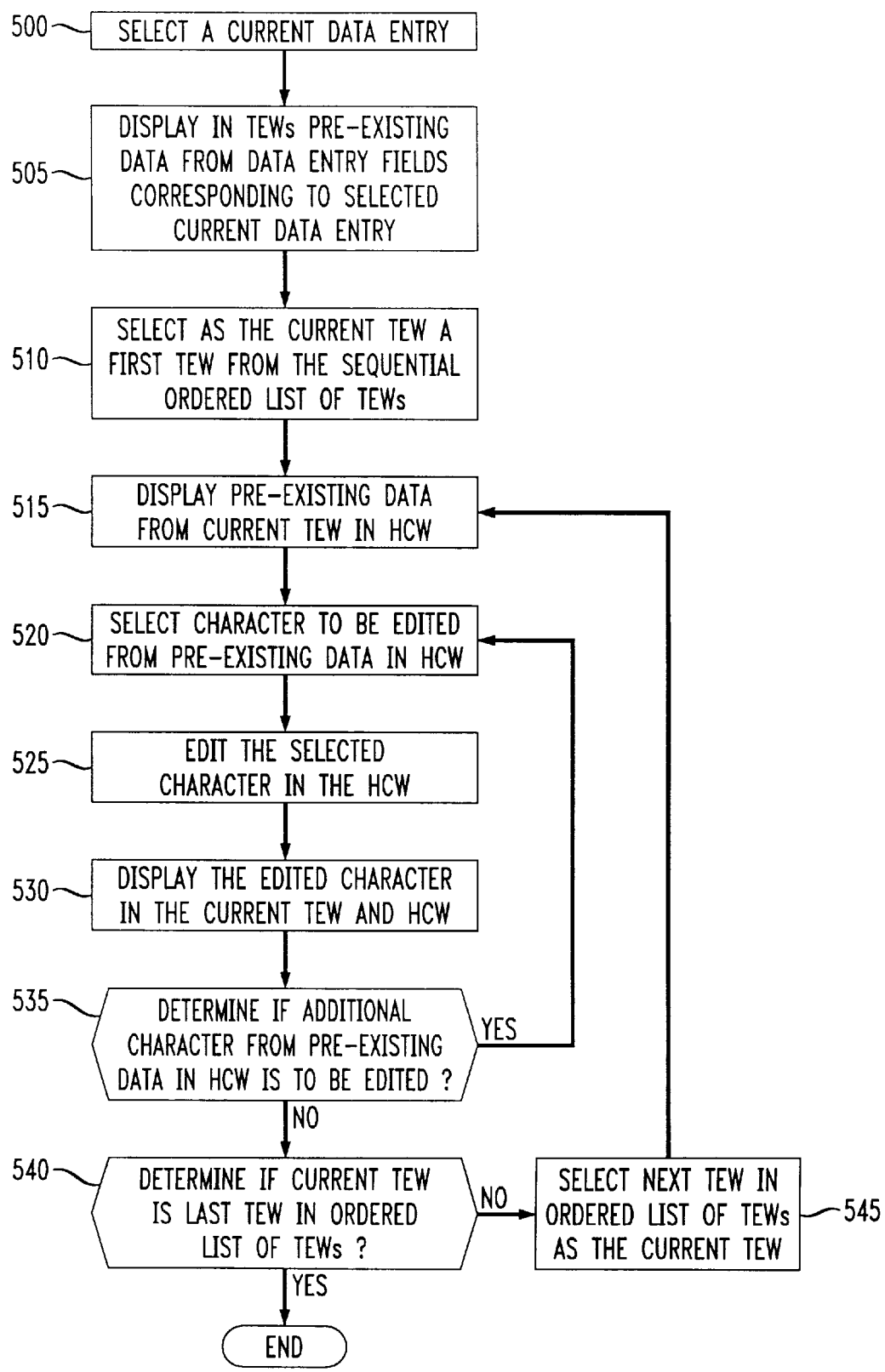
FIG. 6 is a flow chart of a preferred method for editing pre-existing data in the data entry fields using a user interface in accordance with the present invention.

Aside from editing data currently being entered in the HCW, the inventive user interface may be used to edit a pre-existing data entry field in the HCW. A display screen is shown in FIG. 5, which appears after the "Edit" button and the "Earhart" address entry has been selected is shown in FIG. 5. FIG. 6 is a flow chart of the inventive editing process for the user interface. Initially in step 500 the user selects an existing data entry such as an address entry from the address directory and in step 505 the TEWs with the pre-existing data corresponding to the selected data entry are displayed in an overlaid window. In step 510 the current TEW is automatically selected as the first TEW from the predefined sequentially ordered list of TEWs. Pre-existing information in the current TEW is simultaneously displayed in the HCW in step 515 so that it may be easily modified instead of having to reenter the information in its entirety. In step 520 a character to be edited is selected from the pre-existing data in the HCW. One method to select the pre-existing data is for the user to tap on the character in the HCW to be edited using the input device. Once the character in the HCW has been selected it is edited in step 525. In a preferred embodiment a corrections menu similar to that shown in FIG. 4 is displayed as an overlaid window. The corrections menu for editing of pre-existing data differs from that shown in FIG. 4 in that it only provides two options, rewriting the character by selecting the "rewrite" option or entering the character using a soft keyboard by selecting the "keyboard" option. In step 530 the edited character is displayed in the appropriate position of the current TEW and HCW. A determination is made in step 535 whether an additional character from the pre-existing data in the current TEW is to be edited and, if so, then the character to be edited is selected in step 520. Otherwise, a determination is made in step 540 whether the current TEW is the last TEW in the sequentially ordered list of TEWs. If the current TEW is the last TEW in the sequentially ordered list of TEWs then the processing is terminated; otherwise, in step 545 the next TEW in the sequentially ordered list of TEWs is selected as the current TEW and the editing process is repeated for the pre-existing data in the new current TEW.

The preferred handwriting analyzer employed is described in the publication by J. Hu, M. K. Brown and W. Turin, "HMM Based On-line Handwriting Recognition", IEEE PAMI, vol 18, no. 10, pp. 1039–1045, October 1996, which is herein incorporated by reference. This recognizer is based on Hidden Markov Models (HMMs) and supports writer independent recognition of handwritten characters of unconstrained styles. An HMM describes a doubly stochastic process, that is, a process which generates a sequence of states hidden from observation and an observable process which is dependent on the underlying state sequence. HMMs have proven to be successful in modeling on-line handwriting. In the handwriting recognizer employed in the inventive user interface, each character is represented by one or more classes depending on the number of distinct styles observed for the character. Each class is modeled by a left-to-right HMM with a variable number of states and discrete state dependent observation probabilities. For any input character, an N-best decoding algorithm is applied to find the top N closest matches in the alphabet. The HMMs are pretrained on a large number of character samples from different writers.

In a preferred embodiment the Inferno operating system is used, however, other operating systems may be employed. The Inferno operating system is advantageous for use in portable devices since it requires a relatively low-speed processor and a relatively small memory. Furthermore, the Inferno system is multithreaded in that within the portable device itself processor threads communicate with one another using an Inferno channel. This channel facilitates easy transfer of data from one thread to another which is especially useful for the HCW since it communicates with the TEWs and handwriting recognition device.

Although the inventive user interface has been shown and described with reference to an address directory software application any other type of software application may be used. Moreover, the user interface is particularly advantageous when used with a portable display device but is suitable for any type of display device.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for entering new characters or editing pre-existing characters in a plurality of data entry fields on a display screen including a handwriting capture widget in a fixed location and separate from a plurality of text entry widgets corresponding to the data entry fields using a user interface, comprising the steps of:

assigning one text entry widget from a sequentially ordered list of text entry widgets as a current text entry widget;

displaying in the handwriting capture widget any characters in the current text entry widget;

receiving in the handwriting capture widget at least one character for entry into the current text entry widget;

after receipt of the at least one character in the current text entry widget is complete and when the current text entry widget is not a last text entry widget in the sequentially ordered list of text entry widgets, automatically selecting as the current text entry widget a next text entry widget from the sequentially ordered list of text entry widgets; and repeating said displaying step, said receiving step, and said selecting step.

2. A method in accordance with claim 1, wherein said receiving step comprises receiving at least one handwritten new character in the handwriting capture widget.

3. A method in accordance with claim 2, wherein said assigning step comprises automatically selecting a first text entry widget from the sequentially ordered list of text entry widgets as the current text entry widget.

4. A method in accordance with claim 2, wherein said receiving step further comprises:

capturing each handwritten new character as it is being written in the handwriting capture widget; and visually representing each captured handwritten new character in the handwriting capture widget as it is being written.

5. A method in accordance with claim 2, wherein said receiving step further comprises:

transmitting the complete handwritten new character in the handwriting capture widget to a handwriting recognition device;

when a recognized new character has been detected in the transmitted complete handwritten new character by the handwriting recognition device, replacing the visual representation of the complete handwritten new character in the handwriting capture widget with the recognized new character.

6. A method in accordance with claim 5, wherein said receiving step further comprises the step of displaying the recognized new character in the current text entry widget.

7. A method in accordance with claim 2, wherein said receiving step further comprises:

transmitting the complete handwritten new character in the handwriting capture widget to a handwriting recognition device;

when a recognized new character in the transmitted complete handwritten new character has not been detected by the handwriting recognition device, displaying automatically a correction menu with a plurality of editing options;

receiving a user selection of one of the editing options from the correction menu; and replacing the unrecognized new character with a recognized new character generated in response to a user input received as part of executing the user selected editing option.

8. A method in accordance with claim 2, wherein said receiving step further comprises:

transmitting the complete handwritten new character in the handwriting capture widget to a handwriting recognition device;

receiving a user selection of a misrecognized character;

displaying a correction menu with a plurality of editing options;

receiving a user selection of one of the editing options from the correction menu; and replacing the received user selected misrecognized character in the handwriting capture widget with an edited character generated in response to a user input received as part of executing the user selected editing option.

9. A method in accordance with claim 2, wherein said selecting step comprises overriding the sequentially ordered list of text entry widgets.

10. A method in accordance with claim 9, wherein said overriding step comprises receiving a user selection of the current text entry widget.

11. A method in accordance with claim 1, wherein said receiving step comprises receiving at least one edited pre-existing character in the handwriting capture widget.

12. A method in accordance with claim 11, wherein said method further comprises the steps of:

receiving a user selection of a current data entry on the display screen; and displaying in each of the text entry widgets pre-existing characters from the respective data entry fields of the received user selected current data entry, wherein said receiving and displaying steps are performed prior to said assigning step.

13. A method in accordance with claim 11, wherein said method further comprises the steps of:

receiving a user selection of a pre-existing character to be edited in the handwriting capture widget; and editing the received user selected pre-existing character to be edited, wherein said receiving and editing steps are performed prior to said receiving of the at least one character in the handwriting capture widget.

14. A method in accordance with claim 13, wherein said method further comprises the step of displaying the edited character in the current text entry widget, said displaying step being performed prior to said receiving of the at least one character in the handwriting capture widget.

15. A method in accordance with claim 13, wherein said editing step comprises:

displaying a correction menu with a plurality of editing options;

receiving a user selection of one of the editing options from the correction menu; and editing the received user selected pre-existing character to be edited in the handwriting capture widget based on the received user selected editing option from the correction menu.

16. An apparatus for entering new characters or editing pre-existing characters in a plurality of data entry fields on a display screen including a handwriting capture widget in a fixed location and separate from a plurality of text entry widgets corresponding to the data entry fields using a user interface, comprising:

means for assigning one text entry widget from a sequentially ordered list of text entry widgets as a current text entry widget;

means for displaying in the handwriting capture widget any characters in the current text entry widget;

means for receiving in the handwriting capture widget at least one character for entry into the current text entry widget; and means for automatically selecting as the current text entry widget a next text entry widget from the sequentially ordered list of text entry widgets.

17. An apparatus in accordance with claim 16, wherein said receiving means comprises means for receiving at least one handwritten new character in the handwriting capture widget.

18. An apparatus in accordance with claim 17, wherein said assigning means comprises means for automatically selecting a first text entry widget from the sequentially ordered list of text entry widgets as the current text entry widget.

19. An apparatus in accordance with claim 17, wherein said receiving means further comprises:

means for capturing each handwritten new character as it is being written in the handwriting capture widget; and means for visually representing each captured handwritten new character in the handwriting capture widget as it is being written.

20. An apparatus in accordance with claim 17, wherein said receiving means further comprises:

a handwriting recognition device for receiving the complete handwritten new character in the handwriting capture widget and detecting a recognized character;

means for determining whether the recognized character has been detected by said handwriting recognition device; and means for replacing the visual representation of the complete handwritten new character in the handwriting capture widget with the detected recognized new character.

21. An apparatus in accordance with claim 20, wherein said receiving means further comprises:

means for automatically displaying a correction menu with a plurality of editing options when a recognized new character in the transmitted complete handwritten new character has not been detected by said handwriting recognition device;

means for receiving a user selection of one of the editing options from the correction menu; and means for replacing the unrecognized new character with a recognized new character generated in response to a user input received as part of executing the user selected editing option.

22. An apparatus in accordance with claim 20, wherein said receiving means further comprises means for displaying the recognized new character in the current text entry widget.

23. An apparatus in accordance with claim 17, wherein said receiving means further comprises:

a handwriting recognition device for receiving the complete handwritten new character in the handwriting capture widget and detecting a recognized character;

means for receiving a user selection of a misrecognized character;

means for displaying a correction menu with a plurality of editing options;

means for receiving a user selection of one of the editing options from the correction menu; and means for replacing the received user selected misrecognized character in the handwriting capture widget with an edited character generated in response to a user input received as part of executing the user selected editing option.

24. An apparatus in accordance with claim 17, wherein said selecting means comprises means for overriding the sequentially ordered list of text entry widgets.

25. An apparatus in accordance with claim 24, wherein said overriding means comprises means for receiving a user selection of the current text entry widget.

26. An apparatus in accordance with claim 16, wherein said receiving means comprises means for receiving at least one edited pre-existing character in the handwriting capture widget.

27. An apparatus in accordance with claim 26, further comprising:

means for receiving a user selection of a current data entry on the display screen;

means for displaying in each of the text entry widgets pre-existing characters from the respective data entry fields of the received user selected current data entry.

28. An apparatus in accordance with claim 26, further comprising:

means for receiving a user selection of a pre-existing character to be edited in the handwriting capture widget; and means for editing the received user selected pre-existing character to be edited.

29. An apparatus in accordance with claim 28, wherein said editing means comprises:

means for displaying a correction menu with a plurality of editing options;

means for receiving a user selection of one of the editing options from the correction menu; and means for editing the received user selected pre-existing character to be edited in the handwriting capture widget based on the received user selected editing option from the correction menu.

30. An apparatus in accordance with claim 26, further comprising means for displaying the edited character in the current text entry widget.

* * * * *